United States Patent [19]

Gentile et al.

[11] Patent Number: 4,975,321

[45] Date of Patent: Dec. 4, 1990

[54] STRUCTURAL COMPOSITES OF FLUOROPOLYMERS REINFORCED WITH CONTINUOUS FILAMENT FIBERS

[75] Inventors: Wayne F. Gentile, Newark, Del.; Harvey L. Kliman, Chadds Ford, Pa.

[73] Assignee: E. I. Du Pont de Nemours and Company, Wilmington, Del.

[21] Appl. No.: 394,695

[22] Filed: Aug. 16, 1989

Related U.S. Application Data

[63] Continuation-in-part of Ser. No. 209,085, Jun. 20, 1988, abandoned.

[51] Int. Cl.⁵ .......................... D04H 3/02; B32B 27/00
[52] U.S. Cl. ..................................... 428/294; 428/295; 428/421; 428/422
[58] Field of Search ....................... 428/294, 303, 317.9, 428/421, 422, 295, 288; 524/496; 264/108; 174/25; 138/178; 165/180; 526/206

[56] References Cited

U.S. PATENT DOCUMENTS

| | | | |
|---|---|---|---|
| 3,217,083 | 11/1965 | Gore | 174/25 |
| 3,455,338 | 7/1969 | Pollit | 138/178 |
| 3,528,954 | 9/1970 | Carlson | 526/206 |
| 3,635,926 | 1/1972 | Gresham et al. | 526/206 |
| 3,718,181 | 2/1973 | Reilly et al. | 165/180 |
| 3,833,453 | 9/1974 | Segal | 428/303 |
| 4,037,013 | 7/1977 | Sprague | 428/317.9 |
| 4,414,356 | 11/1983 | Michel | 524/496 |
| 4,422,992 | 12/1983 | Michel | 264/108 |
| 4,640,861 | 2/1987 | Binnersley et al. | 428/294 |

Primary Examiner—Thomas J. Herbert

[57] ABSTRACT

A composite comprising a fluoropolymer resin matrix reinforced with continuous filament aligned fibers for use in corrosive high temperature environments.

9 Claims, 2 Drawing Sheets

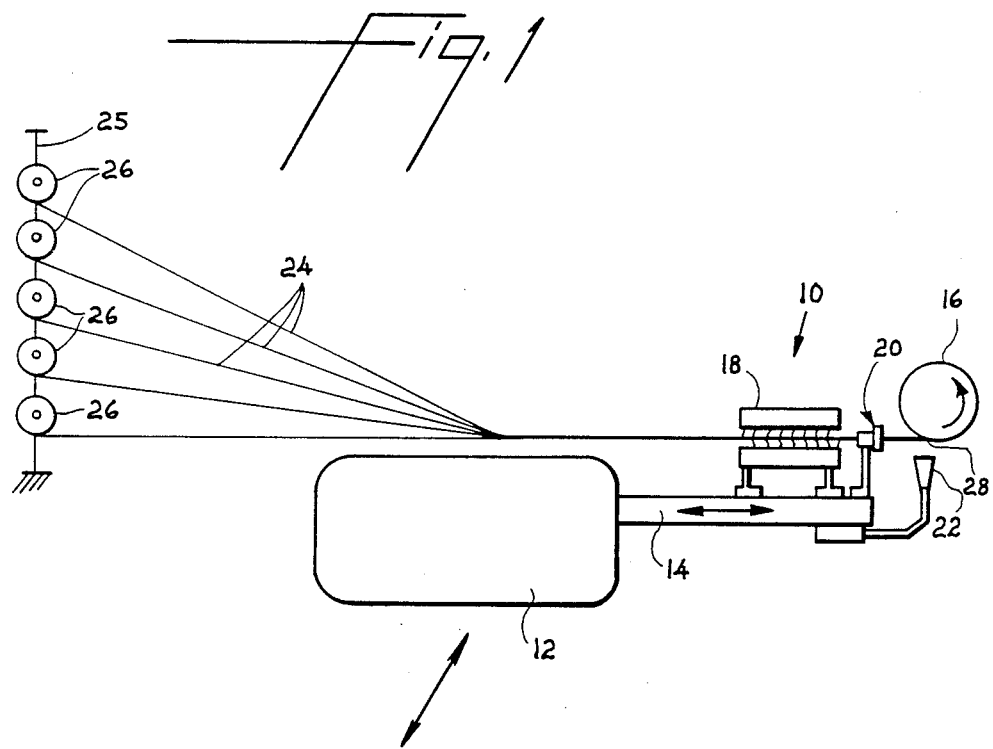
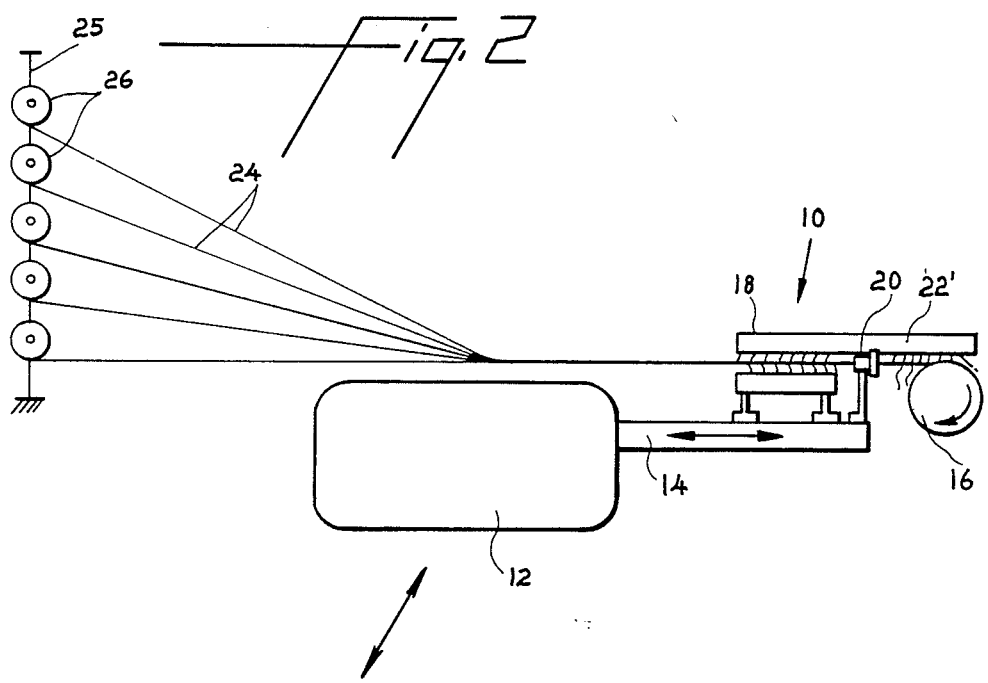

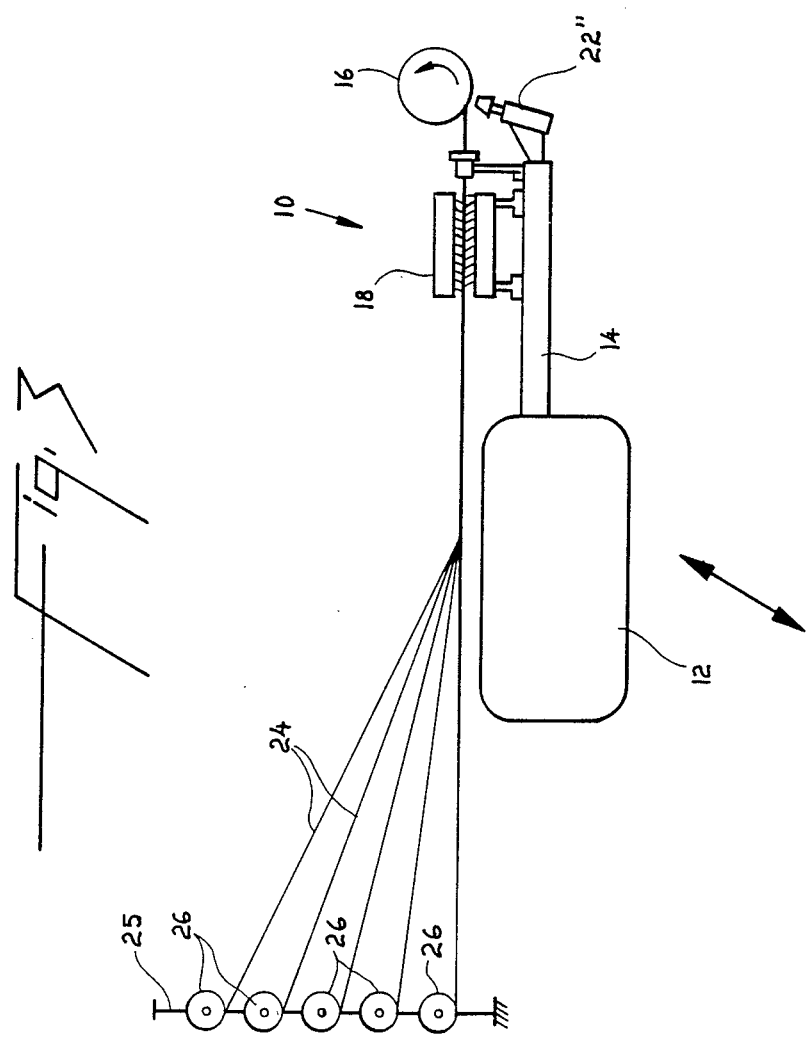

STRUCTURAL COMPOSITES OF FLUOROPOLYMERS REINFORCED WITH CONTINUOUS FILAMENT FIBERS

CROSS-REFERENCE

This application is a continuation-in-part of our copending application Ser. No. 07/209,085 filed June 20, 1988 now abandoned.

BACKGROUND

This invention relates to a fluoropolymer resin matrix reinforced with continuous filament fibers and more particularly it relates to structural composites formed from such a resin matrix for use in corrosive high temperature environments.

Although fluoropolymer resins are known to be corrosion resistant in harsh chemical environments, fiber reinforced composites for structural end uses based on these resins have not been considered practical because of the low strength and low bending moduli. Mechanical properties equivalent to conventional composites have not been obtainable. It would be highly desirable to provide a composite structure with high stiffness, strength and corrosion resistance suitable for high temperature operating conditions found in harsh chemical environments.

SUMMARY OF THE INVENTION

A composite comprising a matrix fluoropolymer resin reinforced with continuous filament fibers such as glass, carbon or aramid fibers. Suitable fluoropolymer resins are fully or partially fluorinated polymers such as PETFE (ethylene-tetra-fluoroethylene) fluoropolymer, PFA (perfluoroalkoxy) fluorocarbon resin, FEP (fluorinated ethylene propylene), P-ECTFE (ethylene-co-chlorotrifluoroethylene), and PVDF (polyvinylidene fluoride). Shaped non-planar as well as planar structures formed therefrom are also encompassed.

The ratio of continuous filament fiber reinforcement to matrix resin can vary from about 10% to about 70% by volume, but preferably is between 30% to 70% by volume.

BRIEF DESCRIPTION OF THE DRAWING

FIGS. 1-3 are schematic representations of apparatus suitable for use in the present invention to form non-planar shaped composite structures.

DETAILED DESCRIPTION OF THE INVENTION

A preferred process for forming a precursor tow of a resin matrix reinforced with continuous filament fibers is disclosed in U.S. Pat. No. 4,640,861 wherein a fiber reinforced material is made by passing a preheated tensioned filament array over an arcuate extruder head wherein polymer is flowed through the filament warp array to coat the filaments with polymer. U.S. Pat. No. 4,640,861 is hereby incorporated by reference. When forming such a tow of carbon fiber with a fluoropolymer resin, it has been found useful for handling the carbon fiber to apply a lubricating finish prior to preheating the filaments.

Other techniques for applying matrix polymer include sprinkling of powdered resin on the fiber followed by heating to melt the resin or intermingling resin fibers with the continuous filament warp, then heating to melt the resin fibers thereby forming the matrix resin and film stacking and/or hot calendaring the warp filament array between layers of matrix film.

The composite structure may be made by a variety of procedures. Thus a tow form as described above may be formed into a filament wound structure or a plurality of segments of such tow may be stacked and heated under pressure to form a distinct composite structure.

To form a filament wound structure an apparatus as shown in the drawing and disclosed in our copending U.S. application No. 095,235 filed Sept. 11, 1987, now abandoned is used to build a structure from a plurality of lengths of fluoropolymer resin reinforced with continuous filament fibers. More particularly, in FIGS. 1-3 the yarn-laying head used in practicing the invention is generally designated by the numeral 10 and is shown to include a traversing carriage 12 upon which is mounted a feed arm 14 movable toward and away from a rotating mandrel 16. The traversing carriage, feed arm, and mandrel are a model W60-16 triple axis filament winder with a N-210 computer by McClean Anderson of Milwaukee, Wis. Mounted to the feed arm are infra-red heaters 28, a heated guide and an open flame heater 22 (FIG. 1).

As carriage 12 is traversed longitudinally of mandrel 16, a plurality of lengths of thermoplastic resin impregnated yarns 24 are pulled from a plurality of supply packages 26 mounted on rolling takeoff creel 25 against a desired level of back tension applied by a mechanism (not shown) associated with the creel for controlling unwind tension on packages 26 such as a Type 800C012 tension compensator by Compensating Tensions Controls, Inc., of West Caldwell, New Jersey.

As the yarn-laying head moves with respect to the structure being wound on mandrel 16, the thermoplastic resin impregnated lengths of yarn 24 are exposed to radiant heaters 18 (model 5535 manufactured by Research Inc. of Minneapolis, Minn.). In these heaters, the thermoplastic resin is heated to a temperature that is within 10° C. of its melt temperature. The lengths of yarn then pass through a heated guide 20 which in the preferred embodiment is a circular eye made of aluminum with a hard anodized finish coated with Teflon. The guide is wrapped with an electrically operated band heater 20a (such as an MI band heater model MBIEIJNI) which raises the temperature of the thermoplastic to a temperature above its melting point but below its degradation temperature which should be understood to be below the melting point of the reinforcing fibers. Mounted at the forward end of feed arm 14 is an open flame heater 22 (a Vulcan Universal propane torch with a No. 3 tip) over which the tapes 24 pass to the laydown location 28 on the mandrel 16. This heater heats the surface of the part being wound on the mandrel through induced heating of the mandrel and direct heating of lengths of yarn 24 as they travel from the guide 20 to location 28 to ensure molten mating surfaces at laydon location 28.

In FIG. 2 the open flame heater 22 is replaced with an infra-red heater 22' (model 5535 by Research Inc.), and in FIG. 3 flame heater 22 is replaced with a hot air gun heater 22'' (Serpentine VI model CHE128767 by Sylvania).

EXAMPLE I

A tow of Hercules AS4 continuous graphite filaments having approximately 3000 filaments is coated with ethylene-tetrafluoroethylene copolymer resin (as described in U.S. Pat. No. 4,123,602) using a melt-injection process (as described in U.S. Pat. 4,640,861). The ratio of fiber to resin was 40%.

Two to four bobbins of the coated tow of these graphite filaments are mounted on rolling take-off creels equipped with a mechanism for controlling unwind tension (Type 800C 012 tension compensator made by Compensating Tension Controls, Inc.). The tow is advanced by means of a rotating elliptical-shaped mandrel downstream and a tension of approximately 2000 gm is applied to each moving tow by the tension mechanism. The moving tow passes through the "head" portion of the downstream filament winder which contains: (1) a pre-heating section (heated with an infrared heater) which heats the tow to 320° followed by (2) a guide eye which is preheated to 320° C. with band heaters, (3) a hot air heating source which is positioned close to the rotating mandrel (3 cm away) and maintains the temperature of the yarn at 320° C., and (4) the tow is finally laid down on an electrically heated mandrel (at about 280° C.).

The computer controlled winder is preprogrammed to produce a 6 ft. long tube with ±45°/90°/±45°/90°/±45°/90° winding angles.

After completing the winding, the mandrel and the tube are cooled for approximately 1 hour until the temperature of the part is about 100° C. These structures performed satisfactorily in corrosive, high temperature environments.

EXAMPLE II

Coated graphite as prepared in Example I was fabricated by frame winding and hot pressing into ⅛" thick unidirectional composite plates. More particularly, coated tow as described above was wound on an 8"×8" frame at 18 tows/inch of width to a total of 16 layers. This unidirectional assembly was hot pressed at 50 psi and 250° C. for 10 minutes to partly consolidate it. The partly consolidated material was cut from the frame and trimmed to 7"×7" to fit a picture frame mold for final consolidation. The mold was put in a heated platen press and heated to 290° C. without pressure. Then the pressure was raised to 250 psi over 10 minutes while the temperature continued to rise to 350° C. Then the pressure was raised to 550 psi and held for 10 minutes. The press was cooled under pressure to approximately 150° C., the pressure released and the mold removed. These plates were subsequently tested per ASTM test procedure D790. The flexural strength was 55,000 psi and the flexural modulus was 11.6 million psi.

EXAMPLE III

A 12" wide band of continuous filament carbon fiber (AS4 from Hercules, Inc.) is formed by spreading approximately 28 tows of 3000 filaments each. This band is fed through a lamination apparatus consisting of a fiber unwind station, guides to align the fibers into a continuous sheet, two film unwinds and guides to position a sheet of film on both sides of the fiber sheet, 14" wide heated nip rolls capable of over 325° C. and over 100 psi, a chiller roll maintained at 50° F., and a winder to take up the product. In the laminator a 12" wide ×0.001" thick sheet of PFA fluorocarbon resin film as described in U.S. Pat. No. 3,528,954 is applied above and below the fiber band, forming a sandwich of PFA/AS4/PFA. This sandwich is subsequently pulled through heated (approximately 305° C.) driven nip rolls of the lamination apparatus at a speed of 5' per minute under a roll pressure of about 60 psi, thereby melting the PFA film and forcing it into the fiber band.

Lamina formed as described above were formed into unidirectional composite plates 7" wide ×7" long ×⅛" inch by stacking 12 to 24 layers, then compression molding them.

These plates were subsequently tested per ASTM test procedure D-790. The flexural strength was 40,000 psi and the flexural modulus was 13.3 million psi.

EXAMPLE IV

Coated tow as described in Example I where the continuous graphite filaments are Hercules AS4 fibers in one instance and Celion G30-500 fibers in another instance and the resin is PFA fluorocarbon resin as described in U.S. Pat. No. 3,528,954, type TE-3000, was fabricated by frame winding and not pressing into ⅛" thick unidirectional composite plates. More particularly, coated tow as described above was wound on an 8"×8" frame at 18 tows/inch of width to a total of 16 layers. This unidirectional assembly was hot pressed at 50 psi and 250° C. for 10 minutes to partly consolidate it. The partly consolidated material was cut from the frame and trimmed to 7"×7" to fit a picture frame mold for final consolidation. The mold was put in a heated platen press and heated to 290° C. without pressure. Then the pressure was raised to 250 psi over 10 minutes while the temperature continued to rise to 350° C. Then the pressure was raised to 550 psi and held for 10 minutes. The press was cooled under pressure to approximately 150° C., the pressure released and the mold removed. These plates were subsequently tested as per ASTM test procedure D790. The flexural strength was typically about 35,000 to 40,000 psi and the flexural modulus was 10 to 11 million psi.

In the alternative, PFA resins may also be produced by the method described in U.S. Pat. No. 3,635,926.

We claim:

1. A structural composite comprising: a matrix fluoropolymer resin reinforced with continuous filament fibers, said matrix resin being from about 30% to about 70% by volume of said composite, said composite having a flex modulus above 5 million psi.

2. The composite as defined in claim 1 wherein said continuous fibers are aligned carbon fibers.

3. The composite as defined in claim 2 wherein said fluoropolymer is an ethylenetetrafluoroethylene copolymer.

4. The composite as defined in claim 3 wherein the composite has a flex modulus of about 12 million psi.

5. The composite as defined in claim 2 wherein said fluoropolymer is PFA (perfluoroalkoxy) fluorocarbon resin.

6. The composite as defined in claim 5 wherein the composite has a flex modulus of about 13 million psi.

7. The composite as defined in claim 1 wherein said fluoropolymer resin is selected from the group consisting of PETFE (ethylene-tetrafluoroethylene) fluoropolymer, PFA (perfluoroalkoxy) fluorocarbon resin, FEP (fluorinated ethylene propylene), P-ECTFE (ethylene-co-chlorotrifluoroethylene), PVDF (polyvinylidene fluoride).

8. The composite as defined in claim 7, said continuous fibers are aligned glass fibers.

9. The composite as defined in claim 7, said continuous fibers are aligned aramid fibers.

* * * * *

UNITED STATES PATENT AND TRADEMARK OFFICE
CERTIFICATE OF CORRECTION

PATENT NO. : 4,975,321

DATED : December 4, 1990

INVENTOR(S) : Wayne Francis Gentile and Harvey Louis Kliman

It is certified that error appears in the above-identified patent and that said Letters Patent is hereby corrected as shown below:

On the title page inventors should read

--(75) Inventors: Wayne Francis Gentile
Harvey Louis Kliman
William Henry Krueger Signed and Sealed this Twenty-third Day of June, 1992

Attest:

DOUGLAS B. COMER

Attesting Officer      Acting Commissioner of Patents and Trademarks